United States Patent [19]

Loehr

[11] Patent Number: 5,554,280

[45] Date of Patent: Sep. 10, 1996

[54] FILTER SYSTEM

[76] Inventor: Gary Loehr, RR1, Box 127 Lime Ridge Rd., Poughquaq, N.Y. 12570

[21] Appl. No.: 441,271

[22] Filed: May 15, 1995

[51] Int. Cl.$^6$ ............................................. C02F 1/24
[52] U.S. Cl. ....................... 210/169; 210/221.2; 119/261; 119/263; 119/264; 261/76
[58] Field of Search ................................ 210/169, 221.2, 210/150, 151; 119/261, 263, 264; 261/76

[56] References Cited

U.S. PATENT DOCUMENTS

| | | |
|---|---|---|
| 3,446,353 | 5/1969 | Davis . |
| 3,616,919 | 11/1971 | Feddern . |
| 3,719,278 | 3/1973 | Kolfertz . |
| 3,772,192 | 11/1973 | Huckstedt . |
| 4,333,829 | 6/1982 | Walther . |
| 4,668,382 | 5/1987 | Jameson . |
| 4,752,383 | 6/1988 | McKay . |
| 4,834,872 | 5/1989 | Overath . |
| 5,078,867 | 1/1992 | Danner . |
| 5,096,572 | 3/1992 | Hwang . |
| 5,108,594 | 4/1992 | Giovanetti . |
| 5,282,962 | 2/1994 | Chen . |

FOREIGN PATENT DOCUMENTS 955321  4/1964  United Kingdom .

Primary Examiner—Thomas M. Lithgow
Attorney, Agent, or Firm—Joseph L. Spiegel

[57] ABSTRACT

A filter system is used in water treatment for removing organic waste from fresh or salt water found in aquariums and culture systems and to facilitate gas exchange between water and atmosphere. The filter includes an air and organic waste laden water mixer, a water-air laden waste separator and an organic waste remover. The mixer is a long tube which has at its top, an inlet pipe that delivers organic waste laden water at high pressure into the tube, and surrounding apertures through which air is drawn. This tube is filled with water-air mixing media such as bioballs and has an outlet opening in the base of the tube which feeds water and waste laden air bubbles into a separator box. The separator box includes a deflector over which the water-air laden organic mix travels. The rising air will pull the organic waste attached to it upward into a foam collector for waste removal. The cleansed or treated water is discharged through a valve beyond the deflector. The valve also controls back pressure to the filter system to assure proper water-air mix within the tube and a proper water level within the foam collector.

11 Claims, 2 Drawing Sheets

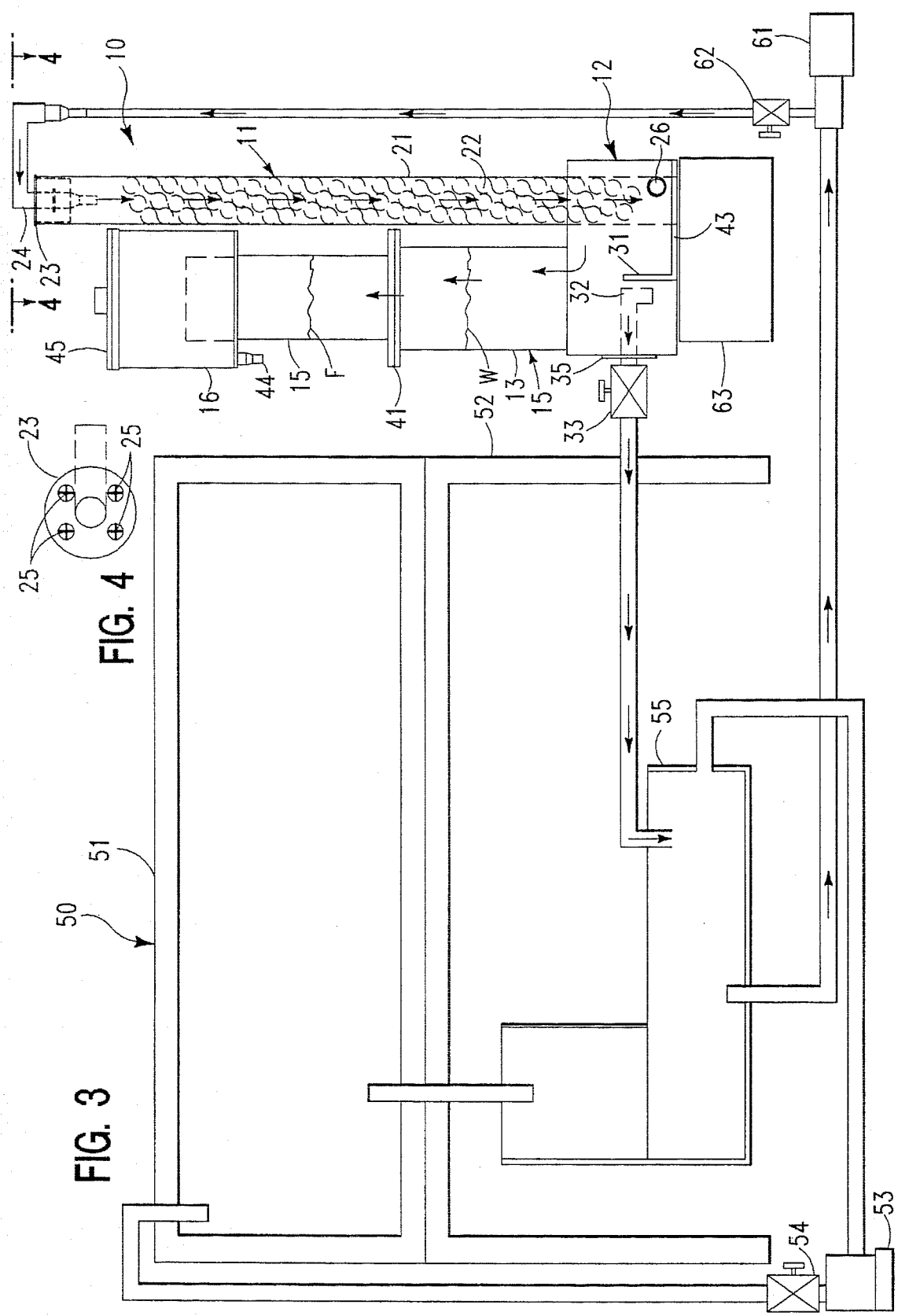

FILTER SYSTEM

BACKGROUND OF THE INVENTION

1. Field of the Invention

This invention relates to a filter system such as the type used in removing organic waste from fresh or salt water aquariums or tanks and to facilitate gas exchange between water and atmosphere. It also is applicable to water treatment systems for culturing invertebrates and other forms of sea life. It is a filter system which works on the principle of foam fractionation in which organic or protein waste is separated out of the water of an aquarium or tank rather than breaking it down within the aquarium and to facilitate gas exchange between water and atmosphere. The aquarium or tanks involved are those used for fish, invertebrates, coral, reef animals and the like.

2. Description of the Prior Art

The patent to Gardner, U.S. Pat. No. 3,624,777 discloses one type of fish tank filter generally known as an under-gravel filter.

In Pond, U.S. Pat. No. 3,778,976, contaminated water from the fish tank is fed to a degassing or purifying unit in order to reconstitute the water, after which the reconstituted water is recycled back to the aquarium. The degassing apparatus is provided with a series of baffles which cause the water to flow downwardly in a zig-zag path causing the water to assume a film-like configuration whereby the water surface is maximized, thus resulting in more gaseous interchange when air is blown over the thinned-out water.

Venturi and other type skimmers such as those illustrated at pages 21, 59, 67, 83, 101, 106 and 187 of Volume 18 Number 2, Aquarium Magazine (February 1995) are readily available commercially.

SUMMARY OF THE INVENTION

An object of the invention is an improved filter system for use with fresh water and salt water aquariums and tanks.

Another object is such a system with greatly improved speed, collectability and gas exchange.

These and other objects, features, and advantages of the present invention are accomplished in accordance with the teachings of the present invention, one embodiment of which comprises a filter system used in water treatment for removing organic waste from fresh or salt water found in aquariums and culture systems and to facilitate gas exchange between water and atmosphere. The filter includes an air and organic waste laden water mixer, a water-air laden waste separator and an organic waste remover. The mixer is a long tube which has at its top, an inlet pipe that delivers organic waste laden water at high pressure into the tube, and surrounding apertures through which air is drawn. This tube is filled with water-air mixing media such as bioballs and an outlet opening in the base of the tube which feeds water and waste laden air bubbles into a separator box. The separator box includes a deflector over which the water-air laden organic mix travels. The rising air will pull the organic waste attached to it upward into a foam collector for waste removal. The cleansed or treated water is discharged through a valve beyond the deflector. The valve also controls back pressure to the filter system to assure proper water-air mix within the tube and a proper water level within the foam collector.

BRIEF DESCRIPTION OF THE DRAWING

Other objects, features, and advantages of the invention will be apparent from the following detailed description and accompanying drawing wherein:

FIG. 3 shows the filter system attached in schematic to an aquarium system; and, FIG. 4 is a section taken along the lines 4—4 of FIG. 3.

DESCRIPTION OF THE PREFERRED EMBODIMENT

Figures 1, 2:
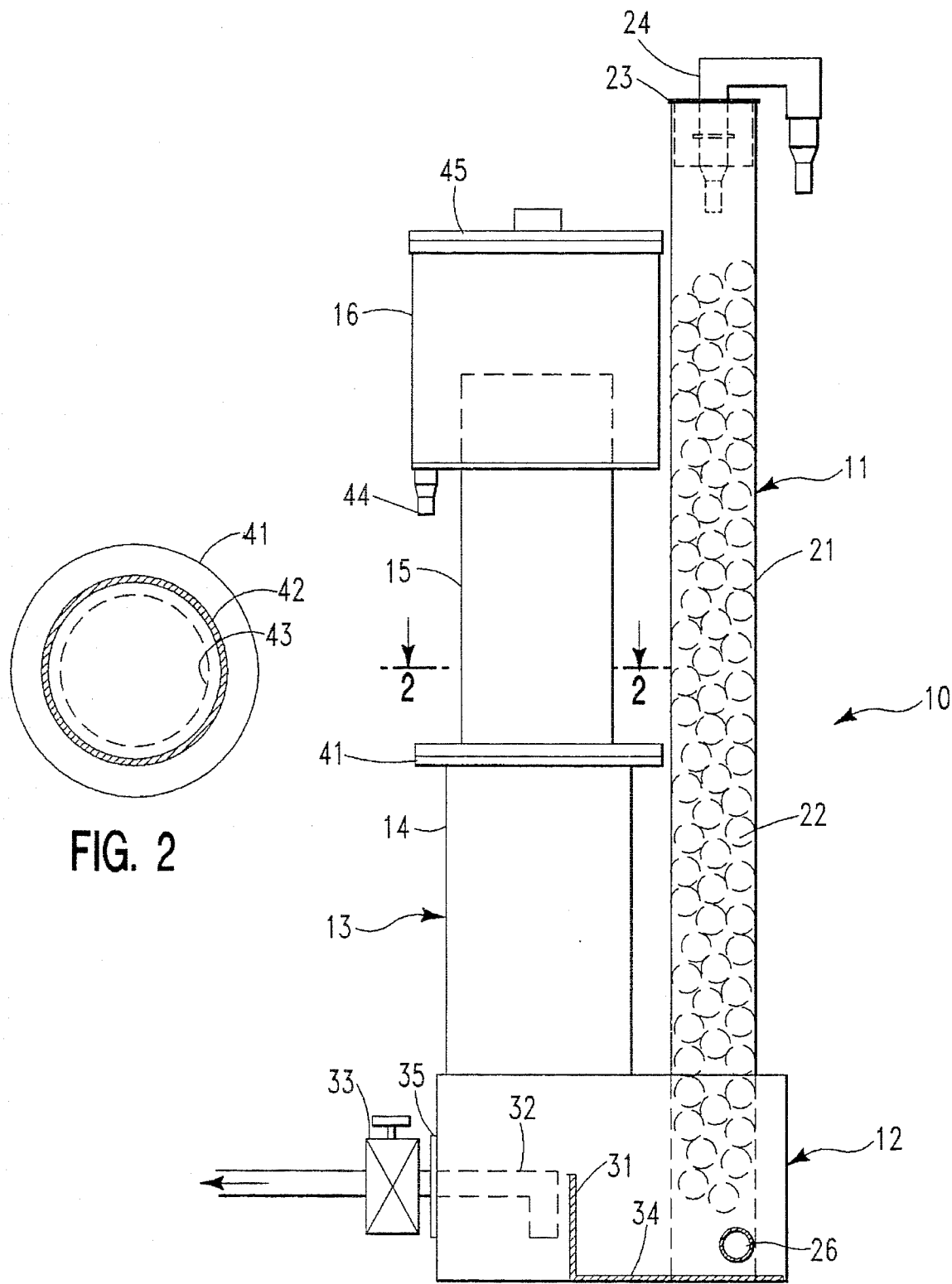
FIG. 1. is a side view of a filter system constructed in accordance with the teachings of the present invention.
FIG. 2 is a section taken along the lines 2—2 of FIG. 1.

Referring now to FIG. 1 of the drawing, the novel filter system constructed in accordance with the teachings of the present invention is shown. The system 10 is seen as including: a tower scrubber stack 11 for mixing liquid (water) that contains organic or protein waste and gas (air); liquid-gas separator box 12 for separating liquid from the waste carrying gas; and, a foam collector 13 including gas collector stack 14, foam-liquid separator 15, and, foam collector-gas discharge cup 16 whereby the organic or protein waste is separated and removed from the system.

Tower scrubber stack 11, includes a relatively long, thin tube 21, typically five feet long, two and three-quarters inch diameter of p.v.c. and/or plexiglass. These are typical dimensions for one application. The diameter and/or number of the tubes 21 is directly proportional to the quantity of water being injected. The tube is filled with large surface area water disbursing media such as bioballs 22. The tube, at its top, is capped at 23, where it supports a liquid (water) inlet pipe 24 and is apertured at 25 (see FIG. 4) to provide a gas (air) inlet.

The mixing media 22 within the tube 21 is designed to produce the largest possible surface area over which the liquid can be spread which in turn greatly increases the amount of liquid surface available for exchange with the gas (air) drawn into the tube 21, hence the largest number of waste attachment sites.

Normally, the gases that are in the liquid which is fed into the tube 21 are not in equilibrium with the gases (air) drawn into the tube 21. As the liquid travels through the tube 21, the gases become equalized.

Additionally, the organic waste within the liquid has an affinity for and will attach more readily to the gas (air)/water interface.

Thus what is to be accomplished in the tube 21 is that the gases become equalized and the waste attaches to the air/water interface. The scrubber stack 11 acts then not only as a skimmer but also as a very efficient air/exchange apparatus. Its high efficiency is due to the fact that the liquid (waste) is broken up to such an extent that exchange becomes quite easy.

The lower end of the tube 21 is disposed within the liquid-gas separator box 12 through an opening and is glued and/or screwed directly to the box 12. An opening in the tube at 26 provides an outlet from the tube 21 to the interior of the liquid-gas separator box 12.

The liquid-gas separator box 12 is of generally rectangular shape, made of plexiglass and as noted previously, receives the lower portion of the tower scrubber stack tube 21. The box is provided interiorly with a deflector 31 and outlet piping 32 leading to a control valve 33. The liquid-gas organic waste containing mix can't go through the deflector 31, it has to go over the deflector. The rising gas will pull the organic waste attached to it upward into the foam collector 13, while the liquid with waste laden gas removed will be drawn to the outlet pipe 32. A plate 34 may be inserted in the base of the box having a bent portion which acts as the deflector 31 and an opening in which the base of the tube 21 may rest.

The valve 33 controls back pressure to the entire system to assure a proper water-air mix within the tube 21 and a proper water level within the foam-liquid separator 14.

The outlet piping 32 and control valve 33 are sealed within the side wall of the box 12 using a bulkhead fitting 35. The top of the box 12 is provided with a large opening on which the foam collector 13 rests.

Gas collector stack 14 is a clear tube of p.v.c. and/or plexiglass resting on the liquid-gas separator box 12 whose cross section is less than that of the box 12.

The foam-liquid separator 15, again a clear tube of p.v.c. and/or plexiglass and whose diameter is equal to or less than that of the gas collector stack 14 is joined via a flange 41 and gasket 42 arrangement. A baffle 43 is built into the flange 41 so as to constrict flow. The diameter of the opening through the flange is approximately two-thirds the diameter of the gas collector stack 14. The constriction cuts down excessive turbulence. Excessive turbulence is to be avoided otherwise the organics are re-dissolved back into the water.

The gas collector stack 14 and foam-liquid separator 15 could be one piece but the flange gasket connector provides a convenient point to break the unit apart for maintenance and add the baffle 43.

The foam collector discharge cup 16, again of clear p.v.c. and/or plexiglass with an apertured base, fits about and is secured to the top of the foam-liquid separator 15 and is provided with a drain 44 and screw-on top 45. The top 45 fits tightly, but is removable for cleaning purposes.

FIG. 3 illustrates schematically a filter system 10 hooked up and operating as part of an aquarium system 50. Drains and hosing and/or piping are shown schematically and unnumbered.

An aquarium tank 51 is shown resting on a stand 52. Water is continually circulated through the tank 51 from a pump 53 through an on-off valve 54 into the tank 51, drained from the tank through a sump tank 55 and back out again from the sump tank 55 to the pump 53.

Water from the sump tank 55 containing waste material is filtered by drawing the water from the sump tank 55 into hosing by means of a pump 61. The pump 61 provides a pressurized water source of say 5-10 p.s.i. and includes a shut-off valve 62 which basically operates as an on-off means.

In use and with the filter system 10 hooked up, outlet valve 33 open and pump 61 on, water from the sump tank 55 which contains waste material or organics is injected via the inlet pipe 24 into the top of the tower scrubber stack 11. The water emerges from the inlet with substantial pressure. As the water runs down the stack 11, it creates a partial vacuum and draws in air through the apertures 25 in the cap 23 from the surrounding area. The partial vacuum causes the gas (air) to become injected into the liquid (organic laden water) stream. As the gas moves down the tube 21 with the water and through the water mixing media 22, it breaks down into water and air bubbles and becomes a foam with the organics attaching themselves to the air-water interface. The further down the tube 21 the mix travels, the bubbles become finer and the mixing of water and air continues.

The air-water contaminant containing mix is driven through the tube outlet opening 26 into the liquid-gas separator box 12. The mix is drawn towards and over the deflector 31. The rising gas will pull the organic waste attached to it upward into the foam collector 13, while the liquid with waste laden gas removed will be drawn to the outlet pipe 32.

Cleansed water discharges from the outlet control valve 33 of the filter system 10, and is gravity fed. Outflow from the filter system 10 must go above the level of the sump tank 55 through hosing into the sump tank 55 and then fed back to the tank via hosing and under the pressure from the pump 53.

Because of the narrowing in cross sections in the foam collector 13 between the gas collector stack 14 and the foam-liquid separator 15, the velocity of the air organic laden mix accelerates as it passes from the liquid gas separator box 12 through the gas collector stack 14 into the foam-liquid separator 15.

Adjustment of the control valve 33 allows the pressure on the water fed into the filter to maintain the water at a level to within the gas collector stack 14 (see FIG. 3 at W). A wet foam takes up the space between the water level in the gas collector stack 14 to a point midway in the foam-liquid separator 15 (see FIG. 3 at F), while above the wet foam is dry foam.

Adjustment of the control valve 33 also provides good liquid gas mixing within the tower scrubber stack 11.

The wet foam is basically a combination of water, waste and gas. The pressure of rising air on the foam organic laden mix is such that the organics in the form of stable foam are driven into the top portion of the foam collector—gas discharge cup 16, where it accumulates and sits. Eventually most of this organic waste falls into the annular space within the cup about the top of the separator 15, breaks down into a liquid and then out through the drain 44. Air also escapes out the drain and into an available collector means (not shown). With the top 45 in place, the flow of air helps to push the protein waste out the drain 44.

Some of the organics, however, build up on the interior of the foam-liquid separator 15 and foam collector—gas discharge cup 16 so that periodically the top 45 must be removed and the built up deposit cleaned off. Approximately ninety percent of the waste material will find its way to the drain 44 while the remaining ten percent has to be removed periodically.

The system 10 is quite powerful and increases effectiveness ten-fold over prior art systems, for gas exchange and the amount of waste collected. Flow rates are adjustable by design but can be as high as two thousand gallons per hour. These ultra high flow rates permit the fastest removal of waste products and efficient gas exchange.

While it should be obvious that changes, additions and omissions may be made in the details and arrangement of parts without departing from the scope of the invention as defined in the appended claims.

What is claimed:

1. A system for removing organic waste from water and to facilitate gas exchange between the water and air, the system comprising:

a source of water containing organic waste;

means for mixing air with organic waste containing water in such manner that the air is broken down into fine air bubbles to which the organic waste becomes attached and gas exchange is carried on thereby, the mixing means including, a tube having an upper and lower end, an inlet pipe at the upper end for delivering said water containing organic waste at pressure into the tube, an inlet means at the upper end of the tube through which air may be drawn, air-water mixing media within the tube for breaking up the air/water into fine bubbles to which the organic waste becomes attached and gas exchange occurs, and an outlet in the lower end of the tube for discharge into the separating means;

means connected to the mixing means for separating the water from the organic waste carrying air bubbles; and, means connected to separating means for removing the organic waste material from the air and for delivering the water to a separate source.

2. The invention defined by claim 1 including valve means on the water delivering means for controlling back pressure within the tube and for controlling the water level within the organic waste removing means.

3. The invention defined by claim 1 wherein the separating means includes a box for receiving the mixing means a deflector between the mixing means and the water delivering means and wherein the water delivering means includes an outlet pipe extending into the box beyond the deflector.

4. The invention defined by claim 3 including a valve means on the water delivering means for controlling back pressure to the filter system and for controlling the water level within the organic waste removing means.

5. The invention defined by claim 1 wherein the organic waste removing means includes a gas collector stack extending upward of and having a cross-section less than the separating means, a foam-liquid separator extending upward of and having a cross-section equal to or less than the gas collector stack, and a foam collector discharge cup secured about and extending upwardly of the foam-liquid separator.

6. The invention defined by claim 5 including valve means on the water delivering means for controlling back pressure within the filter system and for controlling the water level to within the foam liquid separator.

7. The invention defined by claim 5 wherein the foam-liquid separator includes a baffle disposed inwardly of the foam-liquid separator to further constrict flow into the foam-liquid separator.

8. The invention defined by claim 5 where the foam collector discharge cup includes a drain.

9. The invention defined by claim 5 wherein the foam collector discharge cup includes a removable top.

10. The invention defined by claim 5 wherein the foam-liquid separator is removably secured to the gas collector stack.

11. A means for mixing air with organic waste containing water in such manner that the air is broken down into fine air bubbles to which the organic waste becomes attached and gas exchange is carried on thereby, the means including:

a source of water containing organic waste;

a tube having an upper and lower end;

an inlet pipe at the upper end for delivering organic waste containing water at pressure into the tube and feeding the organic waste containing water through the tube via gravity;

an inlet means at the upper end of the tube through which air is drawn due to the gravity action of the organic waste containing water;

air-water mixing media within the tube for breaking up the air/water into fine bubbles to which the organic waste becomes attached and gas exchange occurs; and, an outlet in the lower end of the tube for discharge.

* * * * *